United States Patent [19]

Uhlarik et al.

[11] Patent Number: 4,972,710
[45] Date of Patent: Nov. 27, 1990

[54] LIQUID LEVEL MULTIPLIER AND LEAK DETECTION SYSTEM FOR STORAGE TANKS

[75] Inventors: William J. Uhlarik, Whittier; Jerry A. King, Hacienda Heights, both of Calif.

[73] Assignee: ITT Corporation, New York, N.Y.

[21] Appl. No.: 416,683

[22] Filed: Oct. 3, 1989

[51] Int. Cl.$^5$ ............... G01M 3/26; G01M 3/16; G01M 3/32; G01F 23/18

[52] U.S. Cl. .................... 73/292; 73/302; 73/309; 73/322.5; 73/301; 73/49.2; 73/448; 73/447

[58] Field of Search ............ 73/292, 301, 302, 306, 73/309, 322.5, 49.2 T, 447, 448, 449, 451, 299, 305, 323; 340/622, 623

[56] References Cited

U.S. PATENT DOCUMENTS

| | | | |
|---|---|---|---|
| 1,150,122 | 8/1915 | Jeavons | 73/323 |
| 1,603,390 | 10/1926 | Knobloch | 73/299 |
| 2,185,205 | 1/1940 | Linebarger | 73/449 |
| 2,368,616 | 2/1945 | Rosenberger | 73/299 |
| 2,637,999 | 5/1953 | Klebba | 73/301 |
| 2,743,340 | 4/1956 | Zoltanski | 73/323 |
| 3,017,883 | 10/1962 | Dickinson, Jr. | 73/323 |
| 3,808,893 | 5/1974 | Jinno et al. | 73/449 |
| 4,358,956 | 11/1982 | Ruben et al. | 73/301 |
| 4,571,987 | 2/1986 | Horner | 73/49.2 T |
| 4,604,893 | 8/1986 | Senese et al. | 73/49.2 T |

FOREIGN PATENT DOCUMENTS

| | | | |
|---|---|---|---|
| 758416 | 1/1934 | France | 73/449 |
| 538236 | 12/1976 | U.S.S.R. | 73/305 |
| 594431 | 2/1978 | U.S.S.R. | 73/449 |

Primary Examiner—William A. Cuchlinski, Jr.
Assistant Examiner—Diego F. F. Gutierrez
Attorney, Agent, or Firm—Menotti J. Lombardi

[57] ABSTRACT

A tank leak detection system in which a liquid level multiplier is connected to a differential pressure transmitter one side of which may be piped back into the tank to compensate for internal changes in tank pressure. A capillary having a small bore connects the transmitter and the multiplier to reduce temperature effects. Changes in tank temperature may be sensed, i.e., by a long bulb thermometer and either fed to a temperature transmitter to convert temperature change into a single to a computer used to calculate true tank level and output a signal proportional thereto or fed to the level transmitter to compensate for temperature changes.

4 Claims, 3 Drawing Sheets

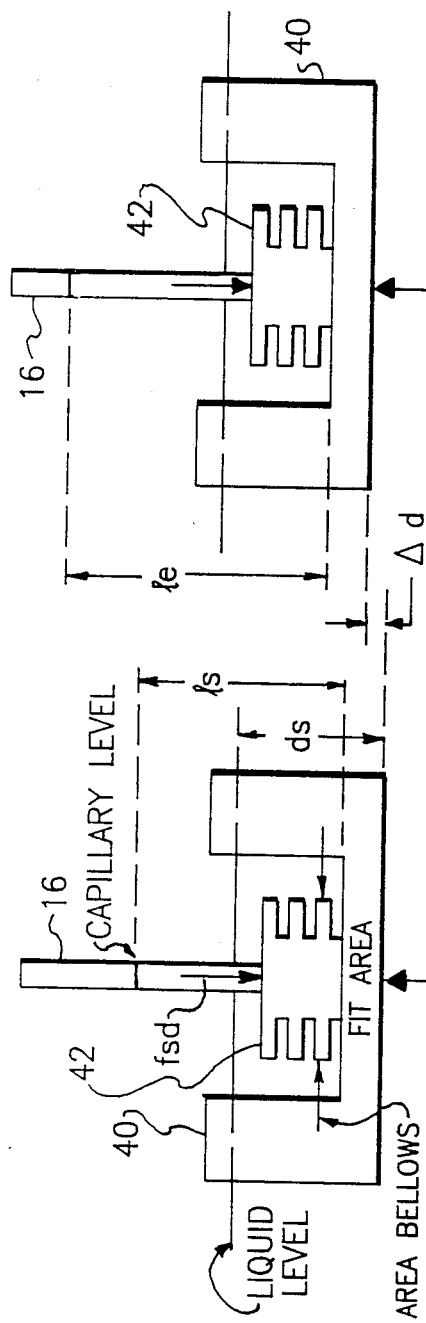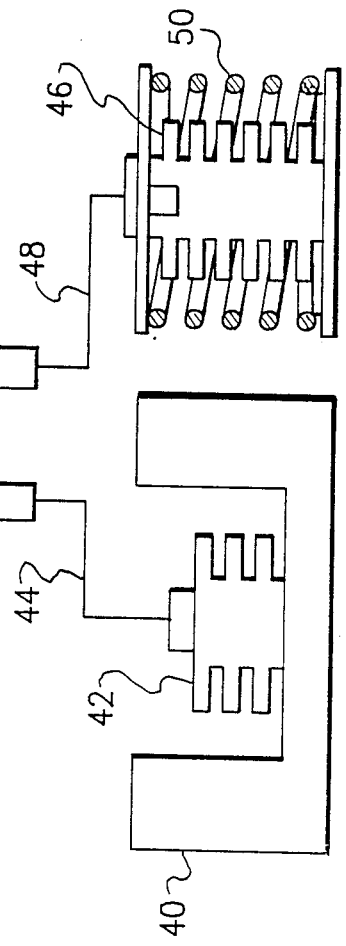

LIQUID LEVEL MULTIPLIER AND LEAK DETECTION SYSTEM FOR STORAGE TANKS

BACKGROUND OF THE INVENTION

1. Field of the Invention

This invention relates generally to the field of fluid measurement systems and pertains more particularly to systems for measuring the rate of leakage of fluid from storage tanks and liquid level sensors therefore.

2. Description of the Prior Art

Detecting leakage from fluid storage tanks is a very problem. For example, leaks from large liquid fuel storage tanks can be very damaging. Detecting such leaks is important in order to allow repair or preventative measures. Detecting leaks when the leak itself is very small or the leakage rate is slow is very difficult using presently available techniques. In one technique a sight glass is mounted on top of a tank. The tank is then filled until a level can be observed in the sight glass. A determination of whether or not there is a leak is made by monitoring the behavior of the fluid in the sight glass. A second method is to read the level in the tank using a dp stick and then come back later and take a new reading, comparing the readings and determining whether or not the tank is leaking. A third method measures by hydrostatic pressure the change in level in the tank versus the hydrostatic pressure in a reference column. The changes in the hydrostatic pressure due to temperature are subtracted out. The resulting change is attributed to a leak.

Jacobs U.S. Pat. No. 3,538,746 shows a system in which submerged differential pressure gauge and electrical conductor 36 is subject to hazard if used with combustible fluid. Equal head pressure is not maintained. Also, the bottom of the pressure chamber 32 is substantially above the bottom of the tank 12, creating temperature errors.

Maresca, Jr. et al., U.S. Pat. No. 4,646,560 maintains equal head pressures, but again the DPU is submerged.

Guigenard, U.S. Pat. No. 3,460,386; Tavis, U.S. Pat. No. 4,627,281; Morooka, U.S. Pat. No. 4,389,888; Knapff, U.S. Pat. No. 3,537,298; Plegat, U.S. Pat. No. 3,921,436; Alm, U.S. Pat. No. 3,939,383; and Torre, U.S. Pat. No. 3,527,909 show similar systems but are considered less pertinent. A patent application, Elderton, Ser. No. 263,451, filed Oct. 27, 1988, a continuation-in-part of a parent case Ser. No. 001,793, filed Jan. 9, 1987, both assigned to the assignee of the present invention, also employs a standpipe which is used as a reference. The standpipe may be positioned inside the tank or may be mounted externally.

The shortcomings of the sight glass method are that abnormal stresses are put on the tank and there is a danger of highly flammable fluid being spilled above ground. Also there can be a problem interpreting the reading in the sight glass. The dipstick method suffers in that the dipstick cannot be read very accurately. It could only be used to detect a relatively large leak. In the comparisons of hydrostatic pressure there is also danger of highly flammable fluid being spilled above ground.

Accordingly, it is an object of the present invention to provide a leak detection system for storage tanks in which there are no abnormal stresses placed upon the tank.

Another object is to provide such a system in which no flammable fluid is brought above ground where there is danger of spillage and explosion.

Still another object is to provide such a system which is more sensitive to small changes in level due to the incorporation of a liquid level multiplier.

SUMMARY OF THE INVENTION

According to a principal aspect of the invention, there is provided a leak detection system consisting of a liquid level multiplier connected to a differential pressure transmitter. One side of the differential pressure transmitter may be piped back into the tank to compensate for changes in internal tank pressure. A capillary connects the liquid level multiplier to the differential pressure transmitter and has a small bore to reduce temperature effects. Changes in tank temperature may be sensed, i.e., by using a long bulb thermometer. A temperature transmitter may convert temperature change into a signal fed to a computer which may be used together with the signal from the level transmitter to calculate the true tank level and output a signal proportional thereto.

In a sub-combination embodiment of the invention, a liquid level multiplier is provided by placing a float on the bottom of a bellows to increase the pressure change in the capillary tube.

BRIEF DESCRIPTION OF THE DRAWINGS

FIG. 2 is a cross-sectional drawing of the bellows, float and capillary tube, showing in FIG. 2a a start position and FIG. 2b an end position, FIG. 4 is a cross-section of an alternate temperature compensation approach showing the use of a bellows and spring for temperature compensation.

DETAILED DESCRIPTION OF PREFERRED EMBODIMENTS

Figure 1:
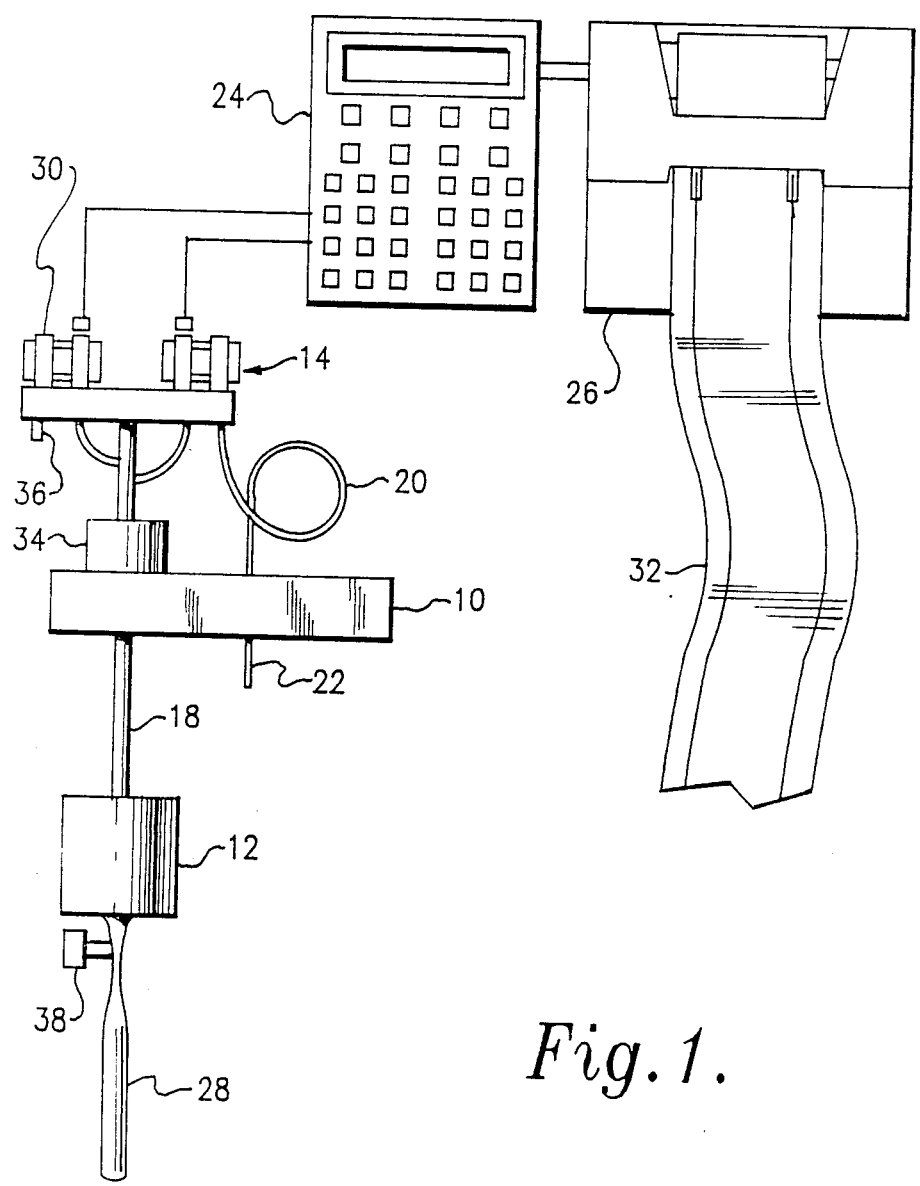
FIG. 1 is a schematic diagram of the underground tank leak detection system.

Referring now to the drawings, FIG. 1 illustrates a leak detection system in accordance with the invention. In normal operation the flange 10 is placed in a manhole underground, the entire tank being underground. The tank itself is not illustrated. The leak detection system measures the changes in tank level and fluid temperature and charts a temperature compensated change in level. Changes in level in the tank are accurately sensed by using a level system that consists of a liquid level multiplier 12 which is connected to one side of a differential pressure transmitter 14 by way of a capillary tube 16 which extends down through support rod 18 to multiplier 12. The other side of differential pressure transmitter 14 is piped back into the tank through pipe 20 to compensate for changes in the internal tank pressure by sensing tank pressure at 22. Capillary 16 connecting the liquid level multiplier 12 to the differential pressure transmitter 14 has a small bore to reduce temperature effects. Also to reduce temperature effects, the transmitter 14 is of a type that requires minimum fill fluid. Transmitter 14 converts changes in liquid level into a form that can be transmitted to a computer 24. Transmitter 14 may be, for example, a Fuji 6000 transmitter and computer 24, an MC 3000 microcomputer, to the output of which a two-pin strip chart 26 is connected.

Change in tank temperature is sensed by using a long bulb thermometer 28 which allows the average temperature of the fluid in the tank to be sensed. A temperature transmitter 30 converts the temperature change into a form that is transmitted to the computer 24 as a second input. The computer then calculates the true tank level and outputs a signal proportional to this level. The computer receives input from both the level system and the temperature system as well as an operator input of starting tank level, relevant strapping table data and an expansion factor of the fluid in the tank. From this data the computer can compensate the reading from the level system for changes in temperature. The strip chart 32 of strip chart recorder 26 is used to record the changes in level attributed to leakage as well as the temperature of the fluid in the tank. An adjusting clamp 34 may be employed for adjusting the support rod 18 up or down.

In operation the system would be mounted on the tank through an access hole. The fluid in the tank is brought to the desired level. The underground leak detection system would be turned on and the support rod 18 adjusted up or down to a point that would generate a center scale reading on the strip chart. The support rod 18 is clamped by adjusting clamp 34 to maintain this position. A leak test is then allowed to run for a prescribed amount of time at the end of which the strip chart is analyzed to determine if a leak is present in the tank. Further refinement may be obtained by adding an ambient temperature probe to sense the temperature around the transmitters and compensate the reading for this change. The temperature transmitter 30 may also be a Fuji 6000 transmitter with its other side vented as at 36, and a temperature range adjust may be provided at 38 on the temperature probe 28.

Turning now to FIG. 2, the liquid level multiplier 12 is illustrated in detail in cross-section together with a section of the capillary tube 16. The multiplier consists of a float 40 connected to the bellows 42 in its center bottom. Bellows 42 is filled and inserted below the liquid level in the tank and is connected to the capillary tube 16 which extends above the top of the tank.

In the prior art, a filled bellows is inserted below the liquid level in a tank and connected to a capillary tube extending above the top. The pressure head from the liquid above the bellows compresses the bellows, forcing the fill liquid in the bellows up the capillary tube and a change in tank level causes an equal change in the height of the liquid in the capillary tube. Small changes in the liquid level are difficult to detect with this type of device. In the present invention the liquid level multiplier provides a larger pressure change in the capillary tube by placing the float on the bottom of the bellows which allows for a more accurate measurement of a small change in tank level either by use of a sight glass or transmitter or any other indicator.

Referring to the start position illustrated in FIG. 2a, fsu, the upward force at the bellows/float interface in pounds is equal to ds, the depth of float in the liquid in inches times the float area in square inches, times the density of the fluid in pounds per cubic inch. The downward force at the bellows/float interface in pounds, fsd, is equal to the starting level of the liquid in the sight glass, ls, (measured from air/liquid interface to bellows/float float interface in inches) divided by 27.7 all times sg, the specific gravity of the fluid involved, times the area of the bellows (which is the effective area of the bellows 42 in square inches).

Turning to FIG. 2b or the end position, feu, which is the upward force at the bellows/float interface in pounds, is equal to the sum of the depth of float in liquid in inches, ds, and the change in depth of float in the liquid in inches, $\Delta d$, times the float area in square inches, times the density of the fluid in pounds per cubic inch. The downward force at the bellows/float interface in pounds, fed, is equal to the ending level of the liquid in the sight glass, le, measured from air/water interface to bellows/ float interface in inches, divided by 27.7, all times the specific gravity and times the area of the bellows, again the effective area in square inches. Thus we have as knowns fsu, fsd, ds, the float area, the density of the fluid, the specific gravity and the area of the bellows, and ls, the starting level of the liquid in the sight glass can be calculated. Also, feu equals fed. The unknowns then are ad and le. A solution for the unknowns is as follows:

(1) le = (1 − $\Delta\_d$)*(area_bellows/area_glass) + ls
(2) (ds + $\Delta\_d$)*flt_area*den_fluid = [(1 − $\Delta\_d$)*(area_bellows/area_glass) + ls]*sg*area_bellows/27.7
(3) ds*flt_area*den_fluid + $\Delta\_d$*flt_area*denf_fluid = [area_bellows/area_glass − ($\Delta\_d$*area_bellows)/area_glass + ls]*sg*area_bellows/27.7
(4) − ds*flt_area*den_fluid + (area_bellows$^2$*sg)/(area_glass*27.7) + (ls*sg*area_bellows)/27.7 = ($\Delta\_d$*area_bellows$^2$*sg)/(area_glass*27.7) + ($\Delta\_d$*flt_area*den_fluid)
(5) $\Delta\_d$ = [(area_bellows$^2$*sg)/(area_glass*27.7) + (ls*sg*area_bellows)/ 27.7 − (ds*flt_area*den_fluid)]/[(area_bellows$^2$*sg)/(area_glass*27.7) + flt_area*den_fluid]
(6) le = (1.0 − $\Delta\_d$)*area_bellows/area_glass + ls
(7) $\Delta\_lsg$ = le + (1.0 − $\Delta\_d$) − ls
   where:
   $\Delta\_lsg$ = change in level in sight glass

EXAMPLE flt_area—1.33 sq. inches
bellows_area—1.33 sq. inches
den_fluid=0.0258 lb/cu in. (approx. sg. of 0.72)
sg=1.00
area_glass=0.1227 (1/8 inch inside diameter)

Using these values, a one inch change in level of the liquid being measured will produce 31.34 inches of change in the fluid in the sight glass. Different multiplication factors can be obtained by using different size floats, bellows, and sight glass. Also, the multiplication factor can be changed by filling the sight glass with fluids of different specific gravity.

Figure 3:
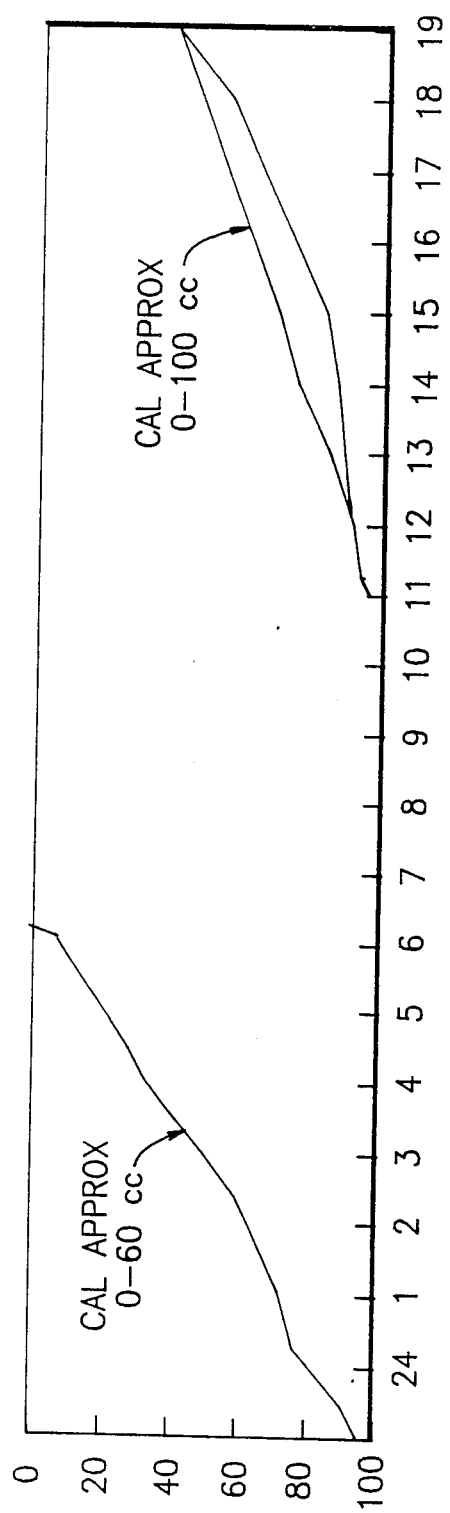
FIG. 3 is a graph showing the performance and repeatability of the liquid level multiplier of FIG. 2.

Accordingly, the use of the float 40 in conjunction with the bellows 42 serves to provide a liquid level multiplier which increases the sensitivity of the system illustrated in FIG. 1. FIG. 3 illustrates data taken on a strip chart recorder illustrating the sensitivity and repeatability of a multiplier such as illustrated in FIG. 2. Each division along the length of the strip chart is one hour. Across the strip chart the left hand end is calibrated for 100 cc evaporation, but shows 60 cc of evaporation in 16 hours. On the left hand end of the chart it is calibrated for 0 to 60 cc and shows that much evaporation in 16 hours, illustrating repeatability of the liquid level multiplier.

FIG. 4 shows a second way of compensating for temperature variations in the liquid level multiplier application. The transmitter 14 is connected through line 44 to the bellows 42 in the float 40. A second bellows 46 is provided and is connected through a line 48 to transmitter 14. A spring 50 is provided around the bellows 46 and has a spring factor such that it resists expansion or contraction of bellows 46 with an amount of force equal to the change in force produced by bellows 42 and float 40 in capillary 44 caused by temperature changes.

The leak detection systems of this invention may te used to meet a need only recently recognized, that is, the need to periodically check the performance of storage tanks. For example, in order to prevent dangerous leakage of toxic materials, some government agencies require scheduled measurement of leakage rates from tanks used for toxic liquid storage. Specifically, annual measurement of leakage from underground gasoline storage tanks at service stations may be required. The system of this invention may be lowered from the top of the tank into the tank and left in place only long enough to make the desired measurement, and is both convenient and portable. Electrical functions are kept outside the tank to avoid problems associated therewith if the fluid is combustible.

Since the principals of the invention have now been made clear, modifications which are particularly adapted for specific situations without departing from those principals will be apparent to those skilled in the art, such as using alternative temperature sensing such as FIG. 1, alternative level sensing means, and alternative methods of combining level changes and temperature compensation while employing the liquid level multiplier. The appended claims are intended to cover such modifications as well as the subject matter described, and to only be limited by the true spirit of the invention.

What is claimed as new and desired to be secured by Letters Patent of the United States is:

1. A tank leak detection system having a liquid level multiplier supported from a flange on the tank by a support member, said multiplier having a bellows or relatively small volume contained on a float of larger volume, adjusting means on said support member for positioning said float at the top of a fluid level in said tank and within the expected levels to be measured, and a level indicator for sensing changes in fluid level in the tank, said level indicator is a level transmitter having one side connected through first capillary to said bellows and another side connected to sense tank pressure above said fluid level.

2. The system of claim 1 including a temperature probe mounted on said support member and having an output connected to one side of a temperature transmitter, the other side of said temperature transmitter being vented to ambient; the output of said temperature transmitter being connected to compute temperature compensated level changes in said fluid.

3. The system of claim 1 including a temperature sensor, the output of said temperature sensor being connected to said level transmitter to compensate for temperature variations.

4. The system of claim 2 in which the output of said computer is connected to a 2-pen strip chart recorder for recording both level and temperature.

* * * * *